United States Patent [19]

Baruffato et al.

[11] Patent Number: 5,207,049
[45] Date of Patent: May 4, 1993

[54] DEVICE FOR SEALING OPEN ENDS OF MONODOSE CONTAINERS ALREADY FILLED WITH LIQUID OR VISCOUS SOLUTIONS

[75] Inventors: Roberto Baruffato, San Lazzaro; Gianfranco Salmi, Casalecchio di Reno, both of Italy

[73] Assignee: Farmomac S.r.l., Via Minghetti, Italy

[21] Appl. No.: 734,954

[22] Filed: Jul. 24, 1991

[30] Foreign Application Priority Data

Jul. 26, 1990 [IT] Italy ................................. 3617A/90

[51] Int. Cl.⁵ ............................................... B65B 51/14
[52] U.S. Cl. .................................. 53/373.7; 53/374.2; 156/583.1
[58] Field of Search .................. 53/141, 373.7, 374.2, 53/374.8, 374.9; 156/308.4, 309.6, 583.1

[56] References Cited

U.S. PATENT DOCUMENTS

| 2,187,516 | 1/1940 | Hallead. | |
| 2,496,609 | 2/1950 | Van Antwerpen | 53/374.2 X |
| 2,515,620 | 7/1950 | Willbrandt | 53/374.2 X |
| 3,032,454 | 5/1962 | Rohdin | 53/374.2 X |
| 4,730,439 | 3/1988 | Chung et al. | 53/374.9 X |

FOREIGN PATENT DOCUMENTS 2553359 6/1977 Fed. Rep. of Germany.
1560594 3/1969 France.

Primary Examiner—John Sipos
Assistant Examiner—Daniel Moon
Attorney, Agent, or Firm—Darby & Darby

[57] ABSTRACT

A device seals an open end of monodose containers, which have already been filled with liquid or viscous solutions without need to trim the sealed ends, comprising grippers with jaws approximately shaped like a comb. In a first version, the jaws have square prongs counter opposed when the gripper is closed and a comb-shaped head inserted between the prongs of the jaws prevents formation of irregular edges at the ends which would otherwise require trimming. In a second version, one of the jaws has prongs which insert into corresponding recesses in the other jaw, while a flat-faced head closes the prongs of the gripper to prevent formation of irregular upper edges.

8 Claims, 3 Drawing Sheets

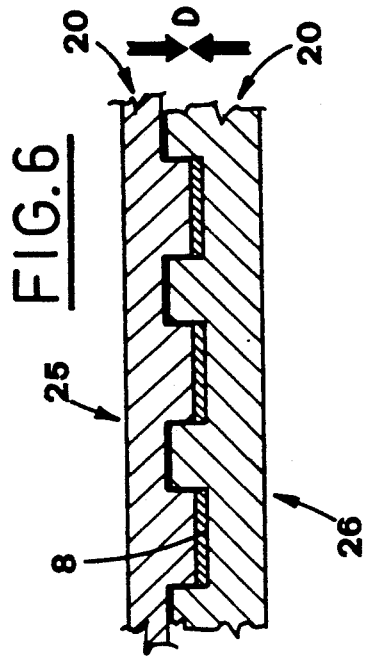
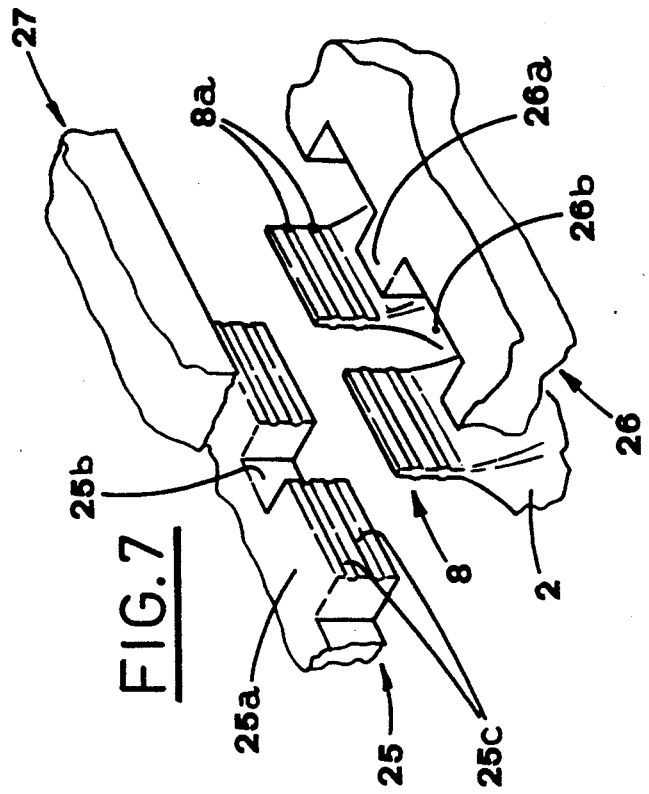
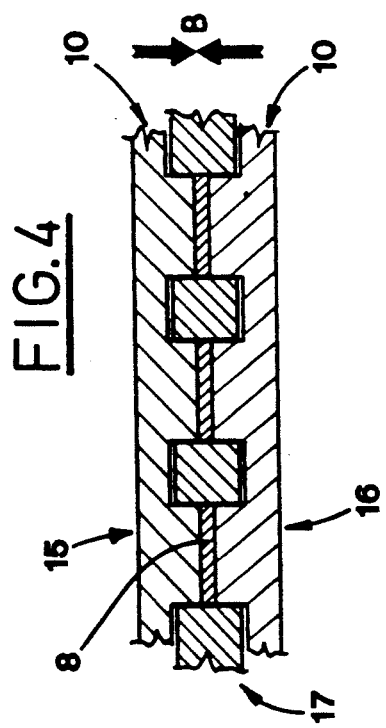
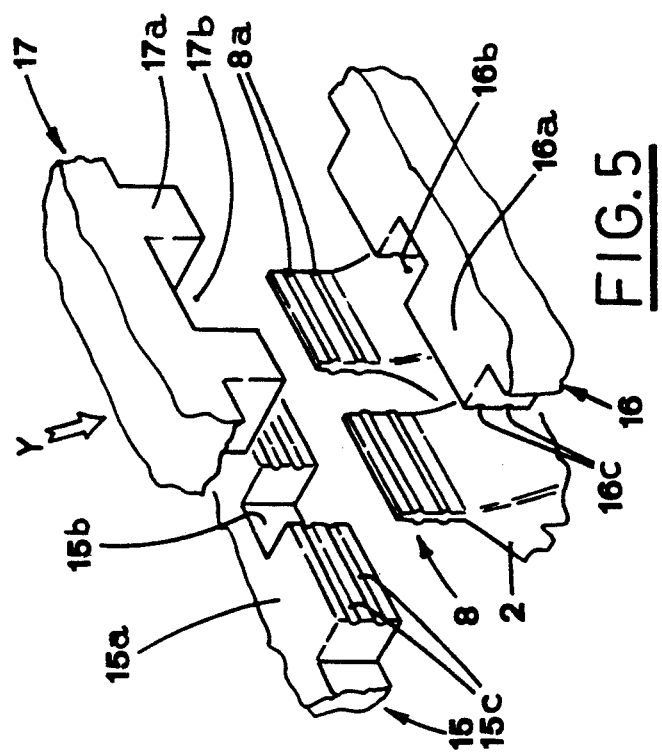

DEVICE FOR SEALING OPEN ENDS OF MONODOSE CONTAINERS ALREADY FILLED WITH LIQUID OR VISCOUS SOLUTIONS

BACKGROUND OF THE INVENTION

This invention concerns a heat welding unit located at a sealing station for sealing the open ends of monodose containers which have already been filled with liquid or viscous solutions by a monodose packaging machine.

DESCRIPTION OF THE PRIOR ART

Packaging machines which package vaccines, eye drops, enemas etc. in monodose containers are well known.

The main purpose of such machines is to package monodose containers so as to safeguard the integrity, the seal and the sterility of their contents.

Monodose containers provide:
sterile products in single doses;
a tamper-proof seal;
measured doses so as to prevent possible errors in drug administration.

It is known that monodose containers conserve the active ingredients of their contents without the need to use preservatives. Using products (such as cosmetics) containing preservatives can in the long term cause considerable damage particularly where preservatives are present in high concentrations.

This occurs with normal multi-dose packaging where preservatives are added during production because the product is destined for use over a long period of time.

It is also known that monodose containers are joined together in sticks of, for example, three, four, five, six or seven single containers.

Monodose containers are usually made of polyethylene or polypropylene materials.

These two materials have very different characteristics. Polypropylene has a higher melting point than polyethylene, for example.

The melting point is a problem which concerns the heat welding or sealing station which forms part of known monodose packaging machines and is located downstream from the filling station on this type of machine.

There are two main heat sealing methods: using hot grippers; or preheating the monodose container with various systems such as hot air and then closing its open ends with cold grippers.

A common problem with all known monodose packaging machines is that once the heat sealing has been carried out using one of the techniques mentioned previously it is then necessary to trim the unsightly irregular edges or plastic drips produced during heat sealing.

With the current state of technology this situation requires the presence of a special trimming station on monodose packaging machines.

This does however create a series of problems. Cutting a strip of the edge material means, for example, that the heat sealed zone is reduced.

The trimming station also requires a system for collecting and removing the offcuts. Offcuts are, however, never removed completely and are spread around the machine thus creating a cleaning and hygiene problem.

The trimming operation itself also creates dust which pollutes a working environment which should, on the other hand, be kept sterile.

A further problem caused by the need to trim the monodose ends is that the packaging machine requires an extra station dedicated to trimming and this obviously increases total machine operating costs and the size of the overall area occupied by the machine.

SUMMARY OF THE INVENTION

To overcome the problem described above, a modification has been made to the heat welding and sealing unit of the monodose packaging machine; this modification is an efficacious and reliable technical solution designed to prevent the creation of irregular edges, which would otherwise require trimming, during the sealing phase.

There are two versions of the modification.

In the first version, the sealing gripper has identical comb-shaped jaws with square prongs where the prongs move towards each other when the jaws are closed.

In this way, when the gripper is closed the square prong faces meet the pre-heated ends of the monodose container to be sealed and press them into the square recesses forming seats between the counter opposing prongs.

At right angles to the gripper there is a comb-shaped head. This head also has squared prongs each of which is inserted into the matching seats created by each pair of facing recesses in the jaws of the said gripper; the head does not, however, prevent oscillation of the jaws.

The pairs of prongs of the joined jaws fit into the corresponding recesses between the prongs of the head.

On completion of the operation which horizontally closes the ends of the monodose container and on completion of the vertical and lateral compression of the sides of the monodose container by the head, the end of the monodose container is perfectly sealed and does not require trimming because no irregular edges have been formed during sealing.

The container thus maintains an aesthetically pleasing appearance without the need to install a trimming and offcuts recovery station.

The problems mentioned previously, especially those relating to offcut recovery and the dispersion in a sterile environment of dust caused by trimming typical to this type of machine are therefore avoided.

Problems of precision are also solved since the heads of all the monodose containers are now identical.

In the second version of the invention, the gripper has comb-shaped jaws as in the first version; these are offset so that the square prongs of the first jaw are inserted into the square recess between the the prongs of the second jaw.

When the gripper closes, this configuration prevents the formation of irregular side edges at the pre-heated ends of the monodose containers.

At right angles to the said gripper there is a square head whose flat faces practically make contact with the upper faces of the prongs of the said gripper so as to prevent the formation of irregular edges on the monodose container following the sealing operation; this head does not, however, prevent the oscillation of the jaws.

This consequently fulfills the aim of this invention which is to eliminate any irregular edges.

There is therefore no need for a trimming and offcut recovery station of the type usually required on the known types of monodose packaging machines and the concomitant problems as described previously are therefore avoided.

BRIEF DESCRIPTION OF THE DRAWINGS

The characteristics of the invention are described in detail in the following description of the two preferred versions which refers to the enclosed drawings.

The drawings are as follows:

FIG. 4 shows a view of section IV—IV in FIG. 3;

FIG. 5 shows a partial, exploded view of the sealing unit according to the first version of the invention;

FIG. 6 shows an overhead view of a cross-section of the second version of the sealing unit; and FIG. 7 shows a partial exploded view of the second version of the sealing unit.

DESCRIPTION OF THE PREFERRED EMBODIMENT

Figure 1:
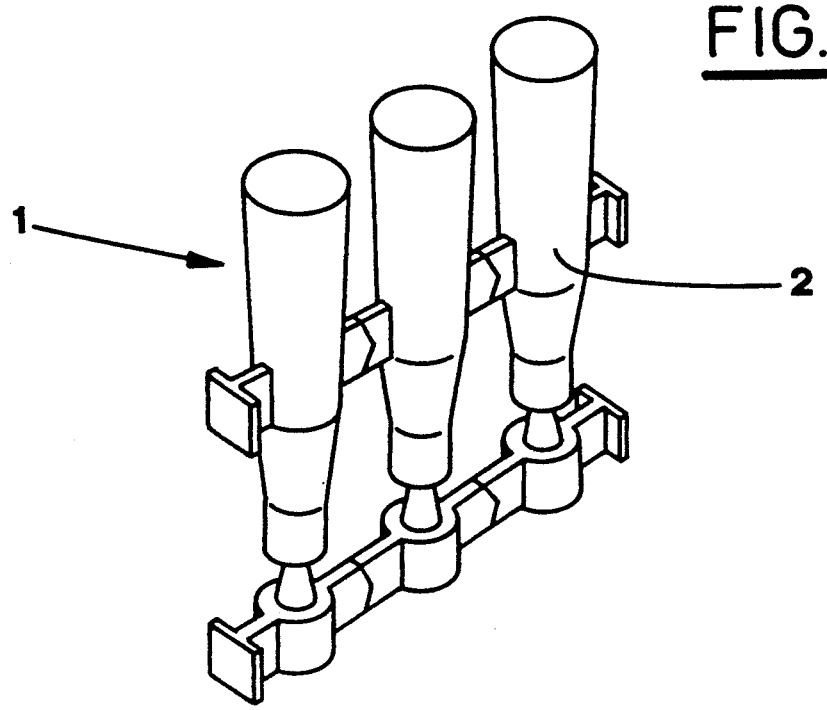
FIG. 1 is a perspective view showing a stick of monodose containers ready for sealing.

With reference to the above mentioned drawings, FIG. 1 shows an example of a stick 1 consisting of three monodose containers 2.

Figure 2:
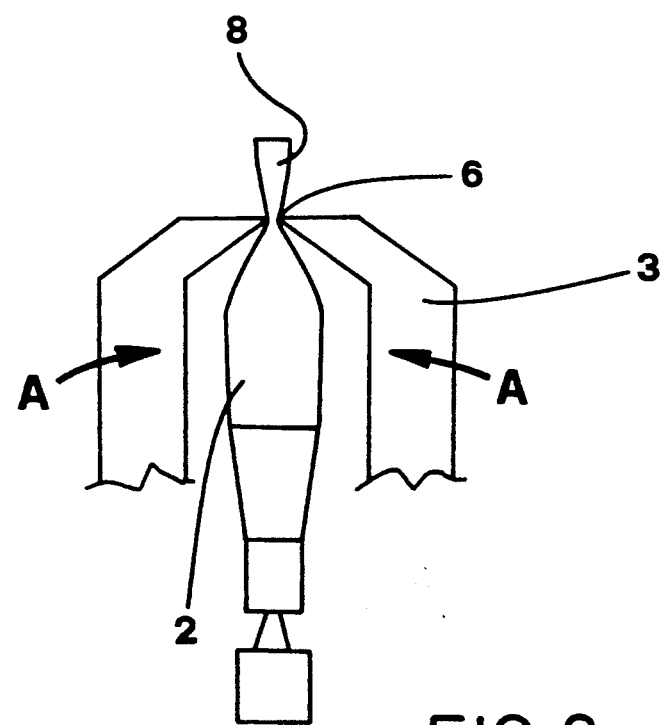
FIG. 2 is a side view showing a monodose container being closed prior to the heat sealing of its ends.
Figure 3:
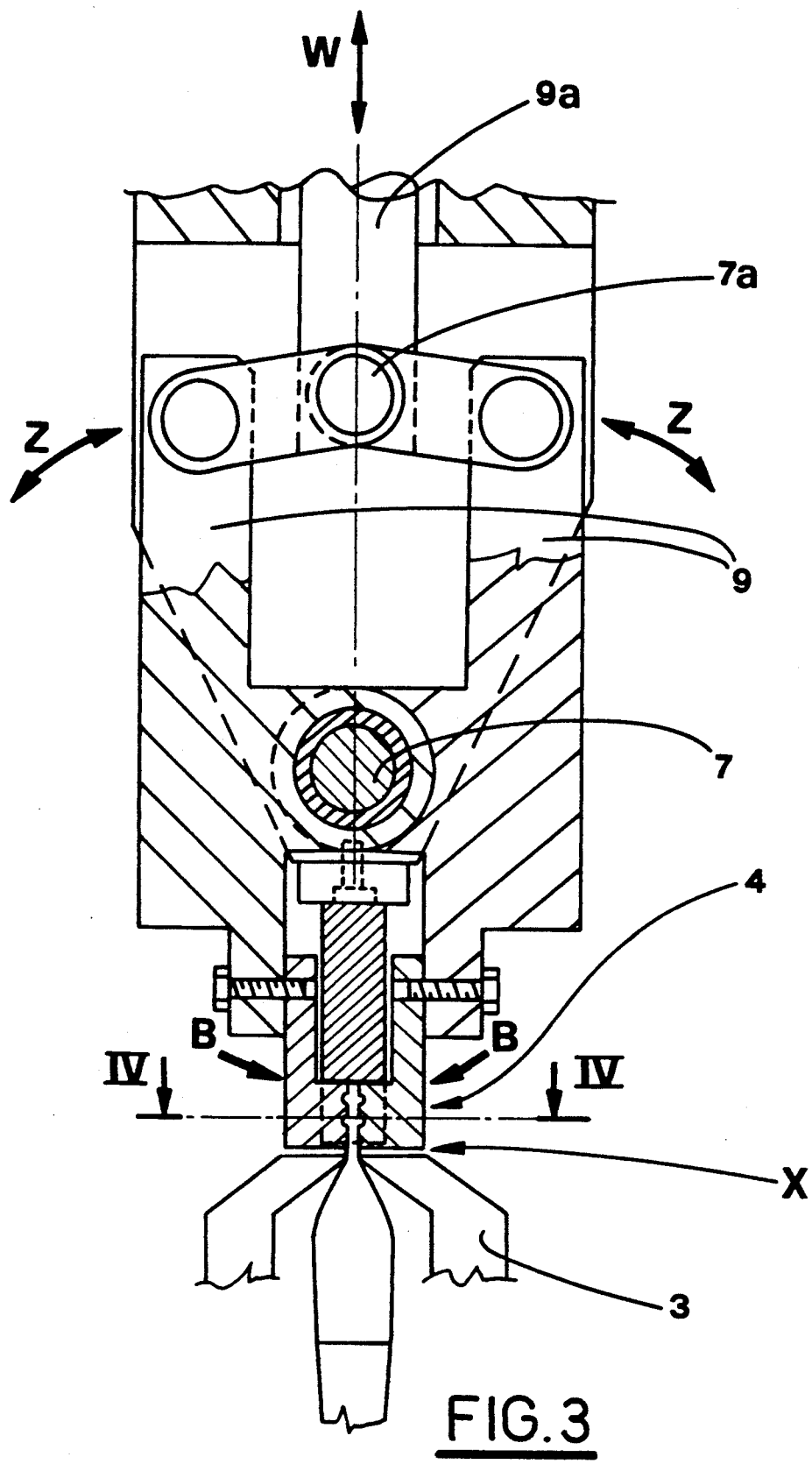
FIG. 3 is a side view showing the heat sealing of the ends of a monodose container by means of the first version of the invention.

FIGS. 2 and 3 show known means 3 for picking-up, transporting and compressing ready-filled monodose containers 2 at a point 6 below the open ends 8 of the said monodose container; these means 3 move in direction A to isolate the contents of each monodose container from the surrounding environment.

The ends 8 are subsequently heat welded by a sealing unit 4 as shown in FIG. 3.

FIGS. 4 and 5 show a gripper 10 shaped in accordance with the first version of the invention; 15 and 16 are identical, comb-shaped jaws of the gripper 10, 15a and 16a are square prongs whereas 15b and 16b are the corresponding square recesses between the said prongs.

The outward facing surfaces of the prongs have lengthways grooves 15c and 16c (in FIG. 5 only the first of these are visible since the second set are not visible from this perspective) which form ribbing, with the profiles of the said facing surfaces of the said jaws 15 and 16, which is parallel to the direction of travel of the monodose container 2.

The said jaws 15 and 16, as is known, pivot around a fulcrum 7 (FIG. 3) and are moved apart and brought closer together (arrow B in FIGS. 3 and 4) by known means 9 and 9a.

The component 9a acts in the direction indicated by W on a pivot pin 7a suitably linked to said means 9 so that these means move in the direction of an arc indicated by Z in FIG. 3 thus opening and closing the said gripper.

When the gripper is in its clamped position X (FIG. 3), the said ends 8 (preheated as described above) of the monodose container 2 are sealed; sealing is a consequence of the pressure exerted by the counteropposing faces 15a and 16a on the preheated ends 8.

There is a head 17 at right angles to the gripper practically touching the upper faces of the prongs and the inner surfaces of the recesses 15b and 16b during closing of the gripper.

The head 17 is also comb-shaped with square prongs 17a and recesses 17b.

The position of the gripper-head assembly during gripper closure is such that the square prongs 17a of the said head 17 fit perfectly into the seat recesses created when the gripper is clamped by the the jaws 15 and 16 corresponding to the recesses 15b and 16b; oscillation of the said jaws 15 and 16 is not prevented in any way.

During sealing of the end 8 of the monodose container 2 by the gripper 10 in the clamped position, the head 17 acts so as to prevent the formation of unsightly irregular edges at the ends 8 and to ensure that the monodose container heads thus created are all identical.

A trimming station downstream from the sealing station is thus not required as is usually the case with known machines.

The head is fixed to the components 9 and 9a which pivot on the fulcrum 7 of the gripper 10 and the pivot pin 7a.

The stages of the process cycle can be summarised as follows: once the monodose containers have been filled using known methods, their ends 8 are pre-heated; the monodose containers are then conveyed and positioned by the means 3 between the open jaws 15 and 16 of the gripper 10 next to the prongs 15a and 16a.

At this point the jaws 15 and 16 of the gripper 10 are moved towards each other as indicated by the arrow B in FIGS. 3 and 4 until they clamp the ends 8 of the monodose container 2.

The squeezing and heat sealing stages as performed by the gripper 3 and the sealing unit 4 respectively are shown in the diagram in FIG. 3. These operations are suitably synchronised.

When the comb-shaped head 17, the prongs 17a inserted into the recesses 15b and 16b and the recess 17b meeting the upper faces of the jaws 15 and 16 are all clamped they ensure the formation of a neat edge on the monodose container so that subsequent trimming of the edge is not necessary; these parts also ensure that all monodose container heads are of the same dimensions. There are consequently no problems arising from offcut recovery or dust in sterile environments.

When the jaws 15 and 16 return to their rest positions (Y in FIG. 5) the monodose container stick is aesthetically and functionally ready for packing. The profile of the ends 8 is determined on both sides by the guides 8a which improve the seal and the appearance of the containers; these guides have the same shape as the grooves 15c and 16c of the prongs 15a and 16a.

FIGS. 6 and 7 show a second version of the gripper 20. 25 and 26 are the comb-shaped jaws of the gripper 20. The jaws 25 and 26 have square prongs 25a and 26a and square recesses 25b and 26b; the jaws are offset so that when the gripper 20 is clamped shut in direction D, the prongs 25a are inserted into the recess 26b and the prongs 26a are inserted in the recesses 25b. This configuration prevents the formation of irregular sides when the gripper 20 is closed and ensures that the monodose ends meet the dimensional requirements referred to previously.

On the walls facing each other of the prongs 25a and the recesses 26b there are lengthways grooves 25c and 26c (in FIG. 7 only the first of these are visible since the second set are not visible from this perspective) which form ribbing, with the profiles of the said facing walls of the jaws 25 and 26, which is parallel to the direction of travel of the monodose container 2.

At right angles to the gripper, practically touching the upper faces of the prongs there is a square head 27 with flat faces positioned in the same way as the head 17 in the first version of the invention.

When the gripper 20 performs heat sealing of the monodose container ends 8, the operation of the head 27 prevents the formation of unsightly, irregular ends which would otherwise require the installation of a trimming and offcut recovery station (as is usually the case with known machinery).

The stages of the heat welding cycle are the same as those previously described for the first version of the sealing unit.

The presence of a head 27 meeting the upper faces of the prongs during sealing gives the edges of the monodose container a neat profile which does not require subsequent trimming. In this case also the problems of offcut recovery and dust dispersion in sterile environments is avoided.

The main advantage of the versions described above is that they make it possible to obtain, during the sealing operation itself, ends 8 on the monodose containers 2 which are without irregular edges; they also create monodose heads of the required standard dimensions.

Further advantages obtained using the invention concern the aesthetic, functional and hygienic characteristics of the monodose container. For example, the neat edges and the ribbed side profile provided by both versions make it possible to dispense with the need to trim the edges of the monodose containers and to dispense with offcut recovery facilities. It is therefore possible to reduce the number of stations on the machine and thus reduce machine costs.

The fact of being able to dispense with monodose container trimming also makes it possible to dedicate a larger surface to sealing and this improves the strength and tamper-proofing of the monodose container.

The solutions proposed also ensure good hygienic conditions with monodose packaging machines; known versions of these machines are not hygienic because the offcuts are not recovered completely but are rather spread around the machine producing dust in suspension in an environment which should be sterile thus causing problems of hygiene and cleanliness; in sterile environments such a situation is unacceptable.

The above description is intended as an example only and is in no way limiting; any variations in construction details (for example, changes in the size of the grippers and the head in relation to monodose size, the number of monodose containers in a stick, etc.) introduced in practical applications are considered to come within the terms of the technical solutions described above and set out in the claims below.

What is claimed is:

1. Apparatus for sealing open ends of thermoplastic monodose containers by squeezing heat welding of said open ends comprising:
   first and second rigid members having opposing teeth forming pairs of opposing surfaces between which the end of a container is placed and there being a recess between adjacent pairs of opposing teeth;
   means for moving said members together to bring the opposing surfaces toward each other to clamp the container open end therebetween to form a sealed area on the container having sides and a top;
   first means for blocking the flow of the container material at the sides of each pair of opposing surfaces of said first and second members to prevent the formation of flashing on the sides of the sealed area of each container; and
   second means for blocking the flow of the container material at the top of each pair of opposing surfaces to prevent the formation of flashing on the top of the sealed area of each container,
   said first and second means comprising a head having a projecting prong fitting into each recess between adjacent pairs of teeth of the first and second members to block the flow of container material at the sides of a pair of opposing teeth, and the portions of the head between the prongs blocking the flow of container material at the tops of the opposing surfaces of each pair of teeth of the two members.

2. Apparatus as in claim 1 wherein at least one surface of each pair of opposing surfaces is ribbed to impart a ribbing to the sealed area of the container.

3. Apparatus as in claim 1 further comprising means for moving said first and second members and said head relative to each other such that the recesses defined between the teeth of said first and second members are moved over the corresponding prongs of said head.

4. Apparatus as in claim 1 wherein said recesses and said prongs are square shaped.

5. Apparatus for sealing the open ends of thermoplastic monodose containers by squeezing heat welding of said open ends comprising:
   first and second rigid members having pairs of opposing surfaces between which the open end of a container is inserted for the formation of sealed area,
   said first and second members having pairs of opposing teeth forming said opposing surfaces and a recess between each pair of opposing teeth;
   a head having a projecting prong fitting into each recess between the teeth of the first and second members when brought into opposing relationship to block the flow of container material at the sides of the opposing teeth and prevent the formation of flashing on the sides of the sealed area, said head having portions between its prongs which block the flow of container material at the ends of the opposing surfaces of the teeth; and
   means for moving said first and second members and said head relative to each other such that the recesses defined between the teeth of said first and second members are moved over the corresponding prongs of said head.

6. Apparatus as in claim 5 wherein said moving means comprises a pivot on which said head and said first and second members are moved.

7. Apparatus as in claim 5 wherein said recesses and said prongs are square shaped.

8. Apparatus as in claim 5 wherein at least one surface of each pair of opposing surfaces is ribbed to impart a ribbing to the sealed area of the container.

* * * * *